J. B. Loomis.

Bustle.

No. 3285. Reissued Feb. 2. 1869.

Jason B. Loomis by his attorney.

K. Wheady

Witnesses.

G. P. Hale Jr

J. A. Snow

UNITED STATES PATENT OFFICE.

JASON B. LOOMIS, OF CHELSEA, MASSACHUSETTS.

IMPROVEMENT IN BUSTLES.

Specification forming part of Letters Patent No. 81,281, dated August 18, 1868; Reissue No. 3,285, dated February 2, 1869.

*To all whom it may concern:*

Be it known that I, JASON B. LOOMIS, of Chelsea, in the county of Suffolk and State of Massachusetts, have invented a new and useful Improvement in Bustles; and do hereby declare the same to be fully described in the following specification and represented in the accompanying drawings, of which—

Figure 3:
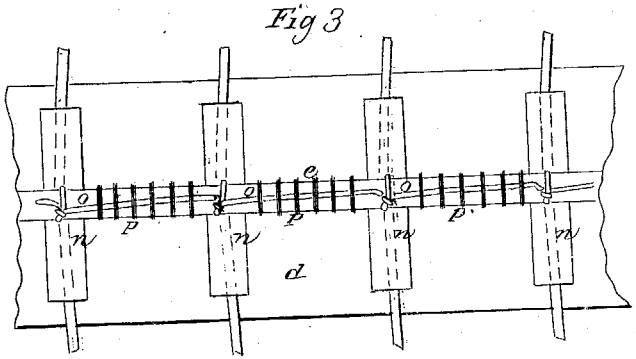
Figure 4:
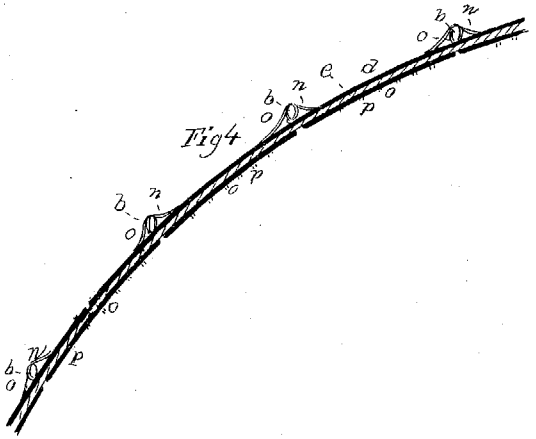
Figure 1:
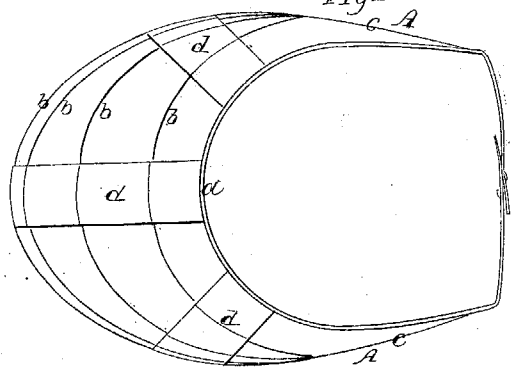
Figure 2:
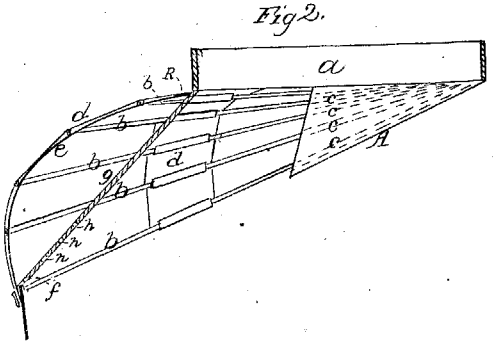

Figure 1 is a top view, and Fig. 2 a vertical section of a bustle provided with my invention. Fig. 3 is an inner side view, and Fig. 4 is a longitudinal section on an enlarged scale of a part of the middle band or tape, its bow-springs, the pockets thereof, and the fastening-cord by which the back-spring *e*, or its covering, is secured at intervals to the rib-springs or the flexile band, as hereinafter explained.

The bustle or body part thereof is composed of a waistband, *a*, a series of ribs, bows, or rib-springs, *b b b b*, two triangular pocket-pieces, A A, (each being provided with pockets *c c c c* to receive and hold the rib-springs at or near their ends,) and a series of pocketed supporting-bands or tapes, *d d d*, for sustaining the rib-springs. Along the middle band, *d*, another bow-spring, *e*, is arranged, which runs through a long pocket or series of pockets extended lengthwise of the band, such being as shown at *p p*, &c. The rib-springs go through transverse pockets formed in the bands *d d d*, they being shown at *n n n*, &c. The metallic part of each of the springs is to be covered with a braided covering—as springs for hoop-skirts are usually covered—and, in order to support the back-spring *e* at intervals relatively to the rib-springs, I fasten them to the covering of the back spring by a thread or cord, *o*, stitched into the two at the crossings of the rib and back springs, and also extended from crossing to crossing along the back-spring. This cord, for the better protection of it, I usually carry through the pockets *p p*, which go lengthwise of the middle band, *d*. A hook, *f*, or its equivalent, is arranged at the lowest end of the spring *e*, near its junction with the lowest of the springs *b b b b*. At the junction of the middle band, *d*, with the waistband a strap, *g*, is fastened, it being provided with a series of holes or eyelets, *h h h*, to enable it to be hooked on the hook *f*. By means of the hook and the eyeleted strap the curvature of the spring *e* may be either increased or diminished, as occasion may require, for obtaining the desirable projection of the bustle from the back of a person while it may be applied thereto. At the upper end of the spring *e*, I apply to such spring and to the middle band, *d*, a shield, abutment, or hooked piece of metal, *k*, which I fasten to the said band *d*. This piece of metal *k* hooks around the end of the spring *e*, and is to prevent the spring *e* from piercing through the bustle or getting out of place. A similar guard may be applied to the other end of the spring *e* if desirable. I contemplate in some cases applying to the bustle more of the springs *e* provided with hooks and adjustable straps, but, generally speaking, I believe but one spring and strap and hook arranged at the middle of the bustle will suffice.

I am aware of the bustle which constitutes the subject of the United States Patent No. 23,681, dated April 19, 1859, and therefore make no claim to such. My bustle differs from it in having the series of bow or rib springs arranged in flexile pocket-pieces A A, or in pockets having flexile connections, so as to enable the springs to be moved toward each other, and in other respects as may be desirable, and furthermore the springs are joined by or connected with the series of flexile bands *d d d* and by the back or bowing spring *e*, provided with the eyeleted or adjusting strap *g*.

The combination of my bustle and the arrangement of its parts are not only different from those of the said patented bustle, but they render mine simpler, easier of adjustment, and better in many other respects. This differs from my invention or employment of the fastening-cord, *o*, its combination with, and its application to, the back-springs and the rib-springs, or their coverings, causing it to perform another function—viz, that of connecting the back and the rib springs so that they may not draw apart and by working through and in their pockets wear the same, the fastening them together keeping them in their due relations to each other, all of which is different from simply fastening hoops to the pockets of a tape or band by means of a fastening-cord stitched into the pockets and the coverings of the hoops.

I therefore claim my arrangement of ribs or bow-springs—

1. The bow or back spring *e*, the hook *f*, or its equivalent, and the adjusting-strap *g*, the whole being applied to a waistband as set forth.

2. The combination as well as the arrangement of the shield or abutment *k* with the bustle made and provided with the spring *e*, as set forth.

3. The arrangement as well as the combination of the bow-springs or ribs *b e*, the flexile pocket-frames A A, the waistband *a*, and the joining flexile bands *d*.

4. In combination with the covering of the back-spring *e*, and with that of each of the rib-springs, a fastening-cord, *o*, stitched into such coverings and extending from one rib-spring to the other, or next of the series, as set forth.

JASON B. LOOMIS.

Witnesses:

JESSE PLATT,

J. R. SNOW.